United States Patent
Hsu et al.

(10) Patent No.: US 6,831,442 B2
(45) Date of Patent: Dec. 14, 2004

(54) UTILIZING ZERO-SEQUENCE SWITCHINGS FOR REVERSIBLE CONVERTERS

(75) Inventors: John S. Hsu, Oak Ridge, TN (US); Gui-Jia Su, Knoxville, TN (US); Donald J. Adams, Knoxville, TN (US); James M. Nagashima, Cerritos, CA (US); Constantin Stancu, Anaheim, CA (US); Douglas S. Carlson, Hawthorne, CA (US); Gregory S. Smith, Woodland Hills, CA (US)

(73) Assignees: General Motors Corporation, Torrance, CA (US); UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/189,823

(22) Filed: Jul. 3, 2002

(65) Prior Publication Data

US 2004/0004852 A1 Jan. 8, 2004

(51) Int. Cl.[7] .............................. H02P 5/34; H02P 7/42
(52) U.S. Cl. .................... 318/803; 318/727; 318/801
(58) Field of Search ................... 318/727, 747, 318/748, 767, 771, 800–806, 254, 439

(56) References Cited

U.S. PATENT DOCUMENTS

| | | | | |
|---|---|---|---|---|
| 4,079,305 A | * | 3/1978 | Peterson et al. | 363/27 |
| 4,321,478 A | * | 3/1982 | Plunkett et al. | 318/150 |
| 4,475,150 A | * | 10/1984 | D'Atre et al. | 318/806 |
| 5,027,264 A | * | 6/1991 | DeDoncker et al. | 363/16 |
| 5,483,140 A | * | 1/1996 | Hess et al. | 318/802 |
| 5,574,345 A | * | 11/1996 | Yoneta et al. | 318/376 |
| 5,767,591 A | * | 6/1998 | Pinkerton | 307/64 |
| 6,351,090 B1 | * | 2/2002 | Boyer et al. | 318/139 |
| 2003/0062870 A1 | * | 4/2003 | Royak et al. | 318/727 |
| 2003/0169015 A1 | * | 9/2003 | Royak et al. | 318/727 |

OTHER PUBLICATIONS

M.H.K. Wang, et al, "Bi–directional dc to dc converters for fuel cell systems," in Conf. Rec. 1998 IEEE Power Electronics In Transportation, pp. 47–51.

H.Li, Fang Z. Peng and J. Lawler, "Modeling, simulation, and experimental verification of soft–switched bi–directional DC–DC converters," IEEE APEC proceeding, 2001, pp. 736–742.

* cited by examiner

*Primary Examiner*—Marlon Fletcher
(74) *Attorney, Agent, or Firm*—Quarles & Brady LLP

(57) ABSTRACT

A method for providing additional dc inputs or outputs (49, 59) from a dc-to-ac inverter (10) for controlling motor loads (60) comprises deriving zero-sequence components ($V_{ao}$, $V_{bo}$, and $V_{co}$) from the inverter (10) through additional circuit branches with power switching devices (23, 44, 46), transforming the voltage between a high voltage and a low voltage using a transformer or motor (42, 50), converting the low voltage between ac and dc using a rectifier (41, 51) or an H-bridge (61), and providing at least one low voltage dc input or output (49, 59). The transformation of the ac voltage may be either single phase or three phase. Where less than a 100% duty cycle is acceptable, a two-phase modulation of the switching signals controlling the inverter (10) reduces switching losses in the inverter (10). A plurality of circuits for carrying out the invention are also disclosed.

12 Claims, 12 Drawing Sheets

$V_{ao}$ $V_{bo}$ $V_{co}$ $V_{ab}$

Time (msecs)

US 6,831,442 B2

UTILIZING ZERO-SEQUENCE SWITCHINGS FOR REVERSIBLE CONVERTERS

STATEMENT REGARDING FEDERALLY SPONSORED RESEARCH

This invention was made with assistance under Contract No. DE-AC05-00OR22725 with the U.S. Department of Energy. The Government has certain rights in this invention.

BACKGROUND OF THE INVENTION

The use of dc-to-ac PWM inverters in adjustable speed drives for controlling loads is becoming increasingly popular. A motor can be driven in an ac synchronous mode or brushless dc (BLDC) mode using a dc link inverter to control three-phase switching of current in the windings of a 3-phase motor.

One object of the invention is to increase efficiency and to lower the cost of manufacture by integrating electromagnetic components.

When the power supply is a dc source, it is desirable to have other auxiliary dc and ac power components of different voltages operated from the sole dc power source. It may also be desired to convert energy from a low voltage dc supply back to the high power dc power source. There are many dc-to-dc converters that can be used to supplement a main ac inverter, but these are separate components. The present invention is designed for application in an apparatus which combines one or more dc-to-dc or dc-to-ac conversions with a motor being controlled by the main inverter.

The increasingly sophisticated application of the contemporary technology often calls for several electromagnetic devices to be used simultaneously. For example, in certain uses of electric motors it is desirable to add various associated devices such as the auxiliary power systems, filters, transformers, and chokes. This creates an opportunity for cost reduction by forming multiple devices from individual components.

SUMMARY OF THE INVENTION

The present invention provides a method and an electronic motor control that utilize zero-sequence components to provide dc-to-dc power conversion for low voltage dc devices operated in a circuit with a larger component, such as a motor. Such low voltage dc devices can include, but are not limited to, dc-to-dc converters, transformers, filter chokes, ac output power supplies, and smoothing filters for the main stator windings in PWM applications. These devices can be physically integrated, at least in part, with the control, inverter, and motor. The present invention provides the necessary power supply voltages from a single motor control.

The zero-sequence voltage or current produced by a PWM inverter can be used to drive a three-phase transformer with the individual phase secondaries of the transformer connected in series to produce a suitable waveform.

The invention provides a method for reverse power conversion in which energy is converted from the low voltage dc side back to the high voltage dc power source.

One advantage of the invention is that the use of zero-sequence currents does not generate any additional torque.

The invention also enables a reduction in the size and reduction in manufacturing cost of the motor drives and accessory power systems.

The invention may be applied to induction machines as well to as permanent-magnet (PM) machines and synchronous machines. As used herein, the term "machines" shall include both motors and generators.

The invention may be practiced with 2-phase modulation which lowers the switching losses of the main inverter.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION OF THE PREFERRED EMBODIMENTS

Figure 1:
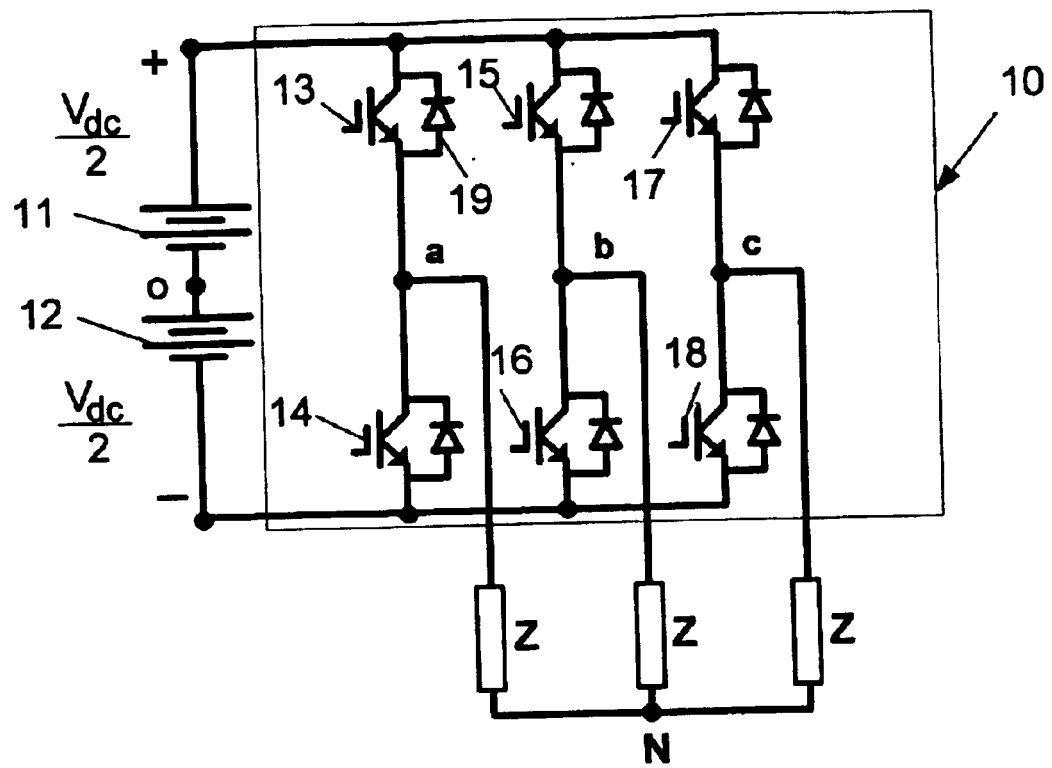
FIG. 1 is an electrical schematic diagram of a PWM inverter of the prior art.

FIG. 1 shows a conventional 3-phase inverter 10 that is fed from a dc voltage source 11, 12 with a line-to-line voltage, $V_{dc}$. The middle potential of $V_{dc}$ is labeled as o. The 3-phase wye-connected circuit of impedances, Z, is electrically connected to the inverter legs at points a, b, and c, respectively. The gate signals of the six power electronic switching devices 13, 14, 15, 16, 17 and 18 control the potentials of the a, b, and c points individually. Each switching device 13–18 has a diode 19 connected in parallel to protect it from reverse voltages and to provide a discharge path when the switch is to be turned off. The gate signals are provided under programmed control of a microelectronic processor (not shown) as is well known in the art. If the switching devices 13–18 are insulated gate bipolar transistor (IGBT) power electronic switching devices, these can be turned on with a few volts of a high gate signal, and turned off with a low gate signal. Consequently, the a, b, and c points can be connected to either the positive (+) side of the dc bus or to the negative (−) side of the bus.

Figure 2:
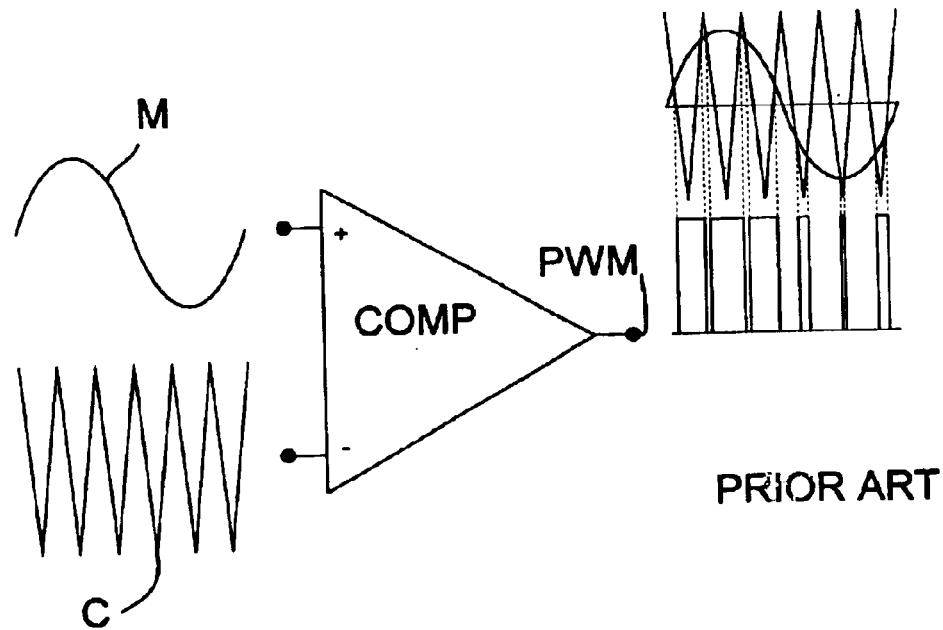
FIG. 2 is a detail electrical schematic with waveforms showing the development of PWM signals according to the prior art.

It is known that the PWM gate signals of the power electronic switching devices can be obtained according to the principle of signal modulation through a triangular carrier wave, C, as shown in FIG. 2. A sine-wave modulating signal, M, is compared with the triangular carrier wave, C. It results in a multiple-pulse gate-signal waveform PWM for turning on or off of the two power electronic switches of one leg of the inverter 10. If the uppermost power electronic switch in a leg is "on," the bottom one must be "off," or vice versa, to avoid a short in one branch of the circuit.

Figure 3:
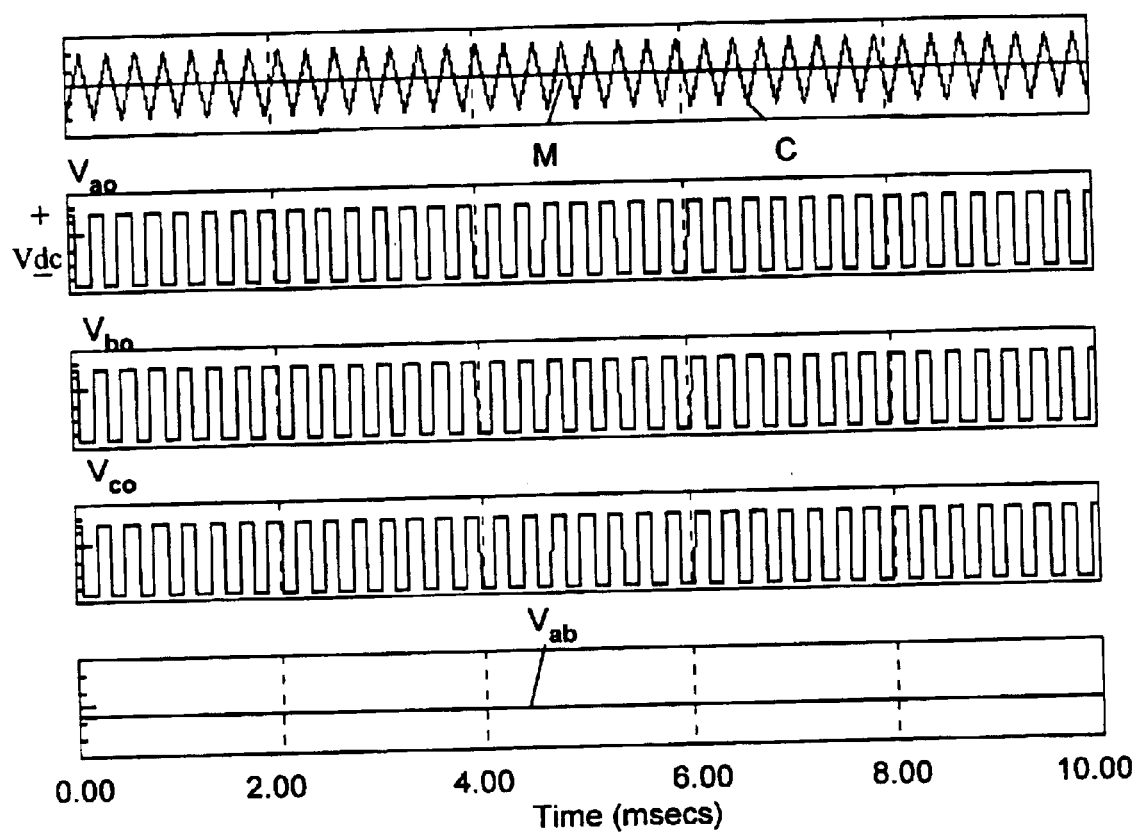
FIG. 3 is a comparison graph of the signals of FIG. 2 and of the zero-sequence components and of line voltage as a function of time.

FIG. 3 shows that when the phase modulating signal is zero, the zero-sequence phase voltages, $V_{ao}$, $V_{bo}$, and $V_{co}$, are not zero. They have the potentials of either the positive (+) or the negative (−) potential of the dc bus. The line voltage, $V_{ab}$ does not contain any zero-sequence component produced by the carrier signal, thus the line voltage such as, $V_{ab}$, is zero. As seen in FIG. 3, the three zero-sequence phase voltages, $V_{ao}$, $V_{bo}$, and $V_{co}$ are in phase. They are the zero-sequence components produced by zero-sequence switchings between positive and negative values.

Figure 4:
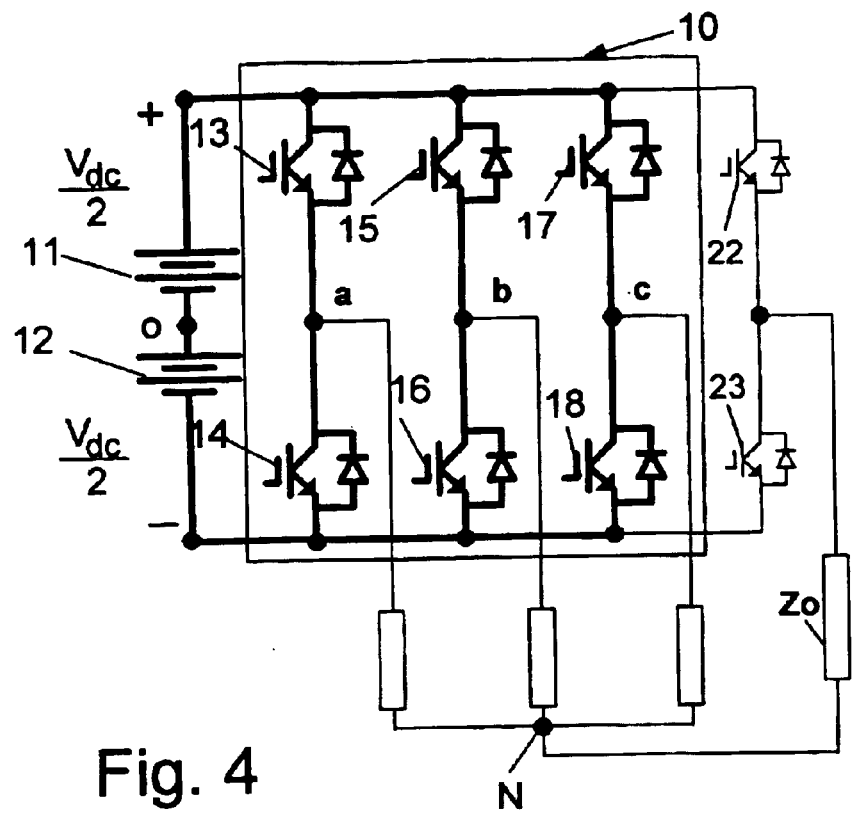
FIG. 4 is an electrical schematic of the inverter of FIG. 1 with the addition of a zero-sequence circuit.

In FIG. 4 the currents of these zero-sequence components, $V_{ao}$, $V_{bo}$, and $V_{co}$, can be collected from the neutral, N, of a 3-phase network. Thus, the zero-sequence circuit is partially formed by the switches 13–18, the 3-phase network connected in a wye configuration, and an impedance Zo. The neutral current going through an impedance, Zo, can be controlled through a fourth leg with power switches 22, 23 added to the main three-phase inverter 10. For each phase, the power switching devices 13–18 of the inverter 10 also act with the fourth leg to form an H-converter to control the zero-sequence current.

Figure 5:
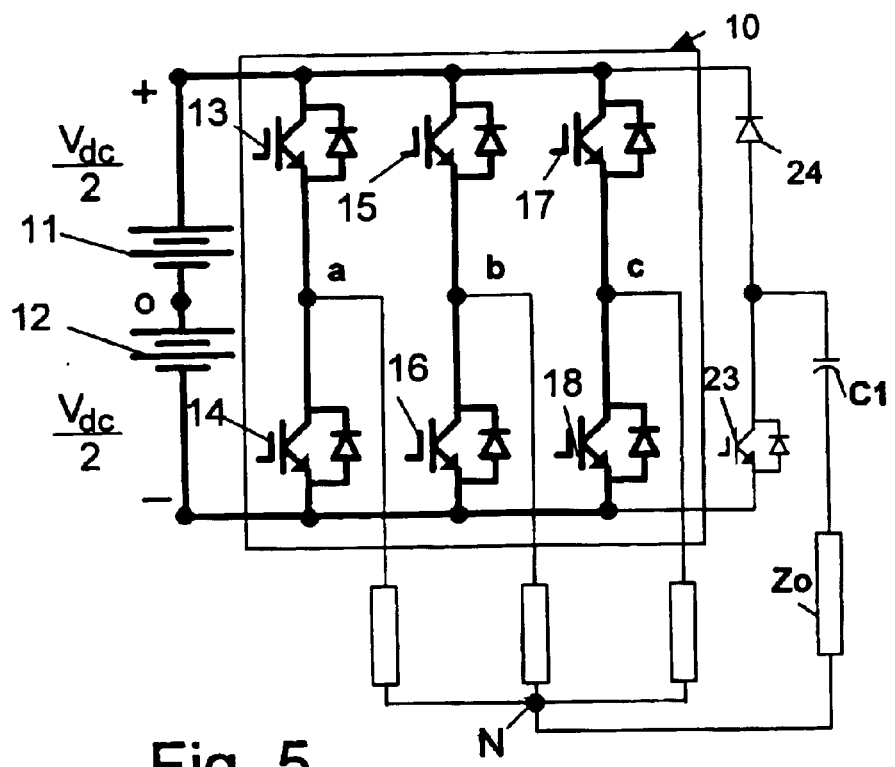
FIG. 5 is an electrical schematic of a modified form of the circuit of FIG. 4.

FIG. 5 shows that the circuit given in FIG. 4 can be simplified. Only one additional power electronic switching device 23 is necessary in the fourth leg for controlling the zero-sequence current, provided that a diode 24 is used in place of switch 22 and provided that a capacitor, C1, is also added to each phase of the 3-phase network.

It should be mentioned that the zero-sequence components in the three phases shown in FIG. 3 are identical. The zero-sequence components associated with $V_{ao}$, $V_{bo}$, and $V_{co}$ would be affected, in the event that the modulating signals were not zero.

Figure 6A:
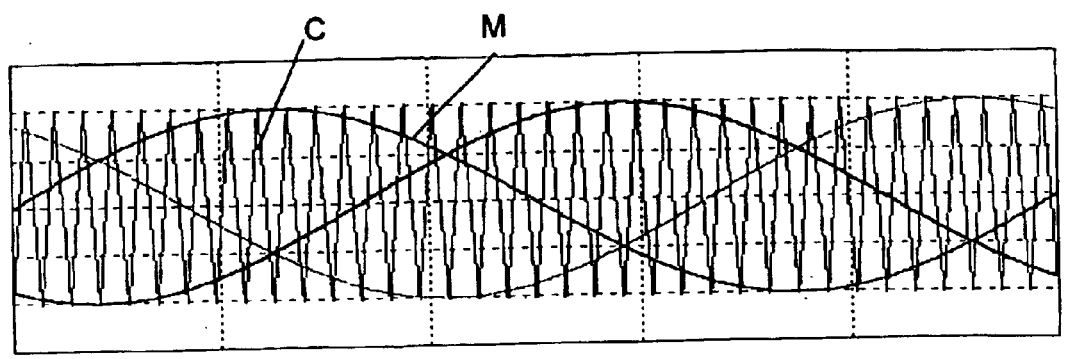
FIGS. 6a–6c are graphs of sine wave modulating signals, of the zero-sequence components, and of a non-zero line-to-line voltage, respectively, as a function of time.
Figure 6B:
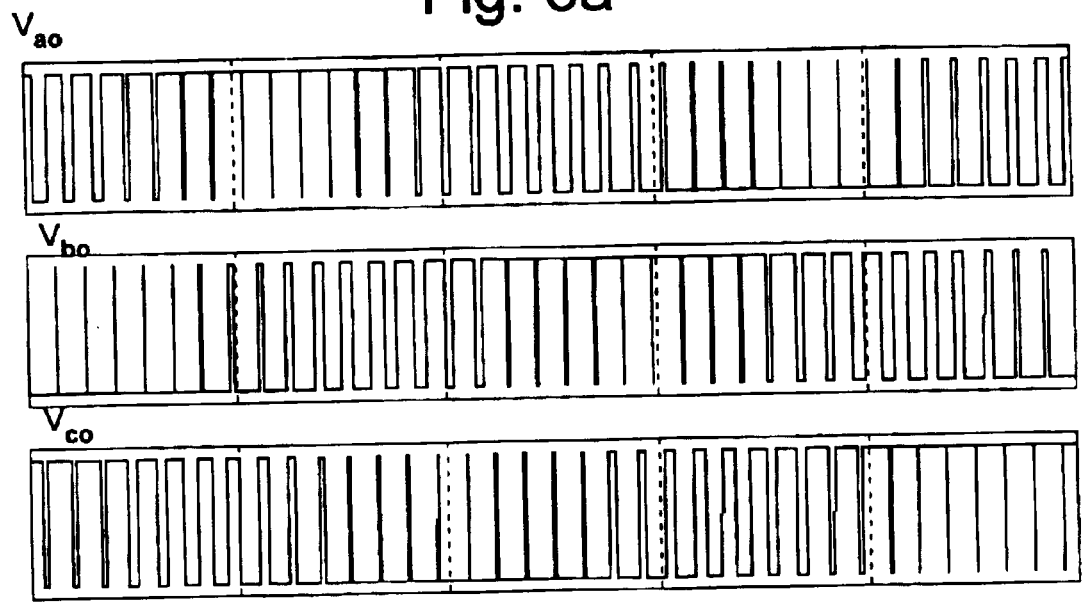
Figure 6C:
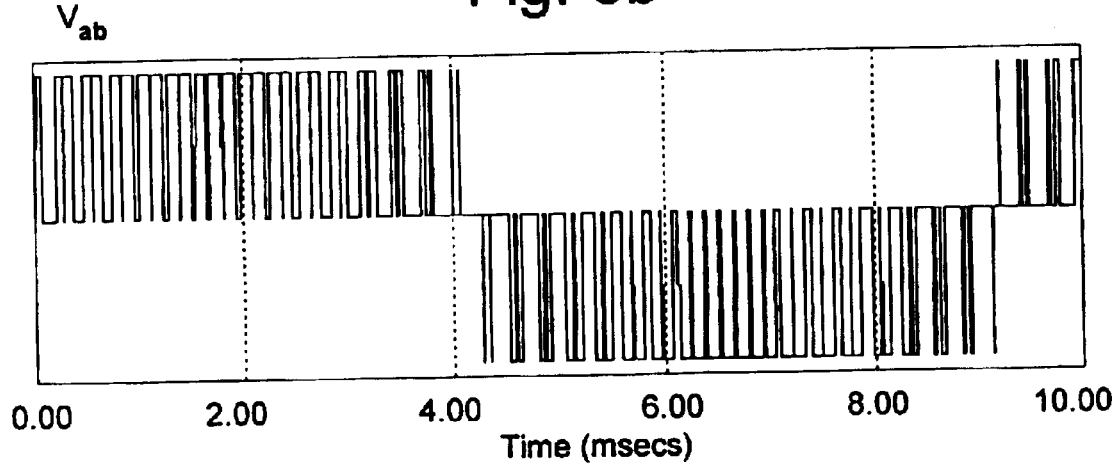

FIGS. 6a–6c show when the modulating signals M are not zero, and when there are three sine waves, the switchings of the $V_{ao}$, $V_{bo}$, and $V_{co}$, are not identical. For example, $V_{ao}$ contains a sine wave component M and pulses at the frequency of the carrier wave C. The value of $V_{ab}$ is no longer zero. The zero-sequence components $V_{ao}$, $V_{bo}$, and $V_{co}$ are modulated by the sine waves M.

Figure 7:
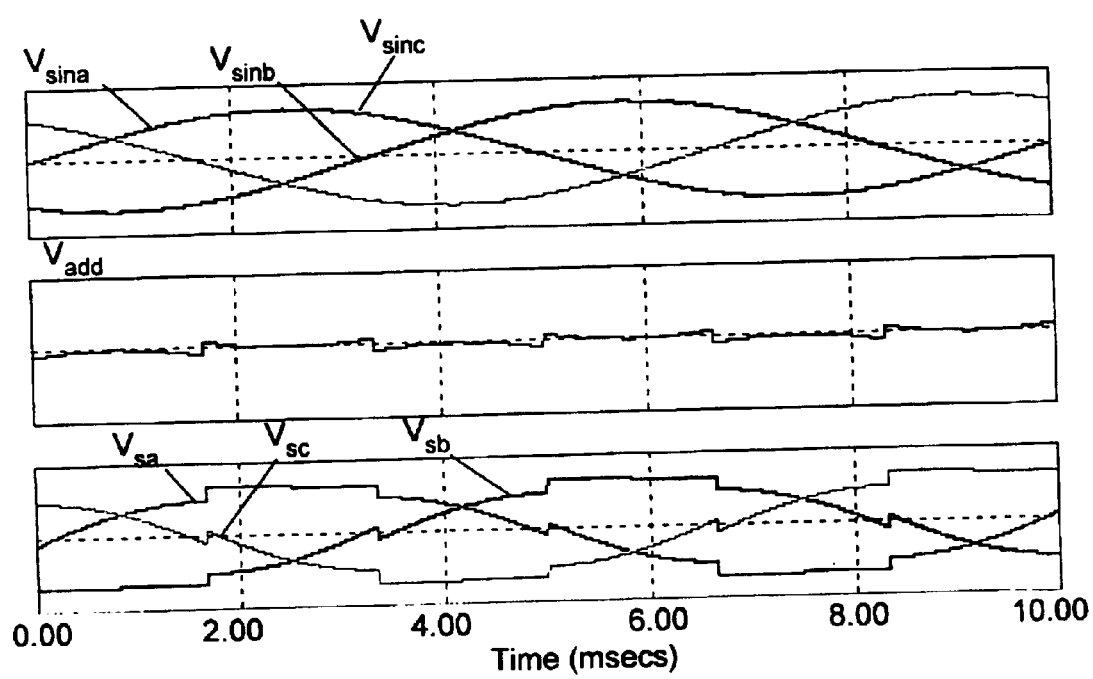
FIG. 7 is a graph of sine wave modulating signals vs. time for a 2-phase modulation.

FIG. 7 illustrates that the sine wave modulating signals, $V_{sina}$, $V_{sinb}$, and $V_{sinc}$, can be further modulated to produce two flattened regions of magnitude per cycle by adding a $V_{add}$ signal as those shown in FIG. 7. This is referred to as a two-phase modulation, which by itself, is known in the art.

Figure 8A:
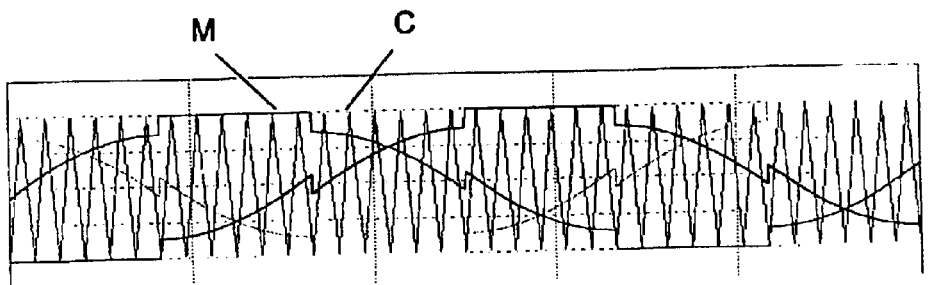
FIGS. 8a–8c are graphs of the of sine wave modulating signals, the zero-sequence components, and the line-to-line voltage for a 2-phase modulation.
Figure 8B:
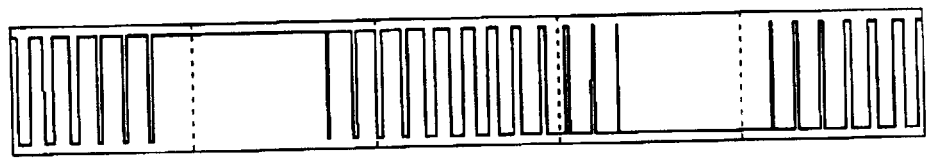
Figure 8B:
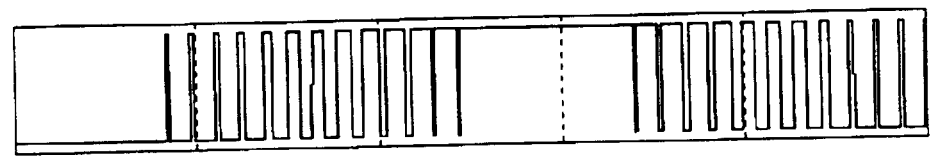
Figure 8B:
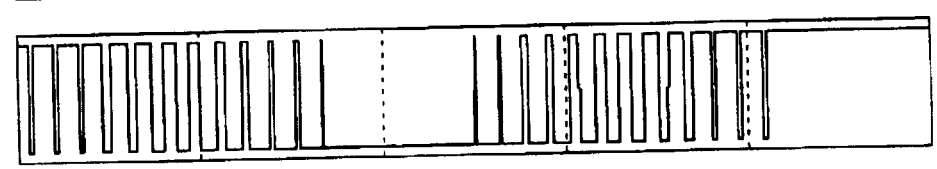
Figure 8C:
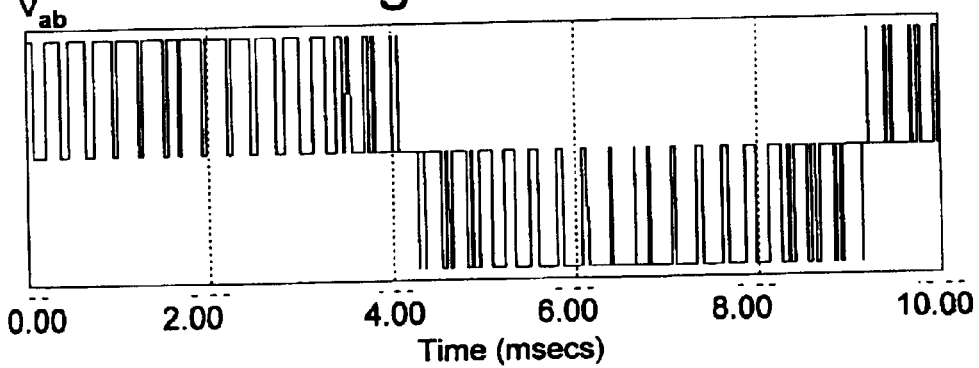

FIG. 8a shows that the two-phase modulating waves M are more non-sinusoidal than the sinusoidal, distributed modulating signals M shown in FIG. 6. The two non-switching regions per cycle represented by the flat portions of the waves M shown in FIG. 8a reduce the duty cycle per phase to two-thirds duty-cycle waveforms. These duty cycles produce asymmetrical zero-sequence switching components $V_{ao}$, $V_{bo}$, and $V_{co}$, in FIG. 8b and line-to-line voltage $V_{ab}$ seen in FIG. 8c. However, the sum of the three phases can make the envelope of the zero-sequence-switching output waves more even as compared with those of the single-phase outputs produced by the circuits shown in FIGS. 15 and 16.

In order to obtain auxiliary dc output voltages different from a dc power source, three basic functions must be provided. They are: 1) a switching function that changes dc to ac, 2) a transformer function that steps down or steps up the ac voltage, and 3) a rectifier function that converts ac to dc. Additional ac outputs can also be obtained from the first two functions.

Figure 9:
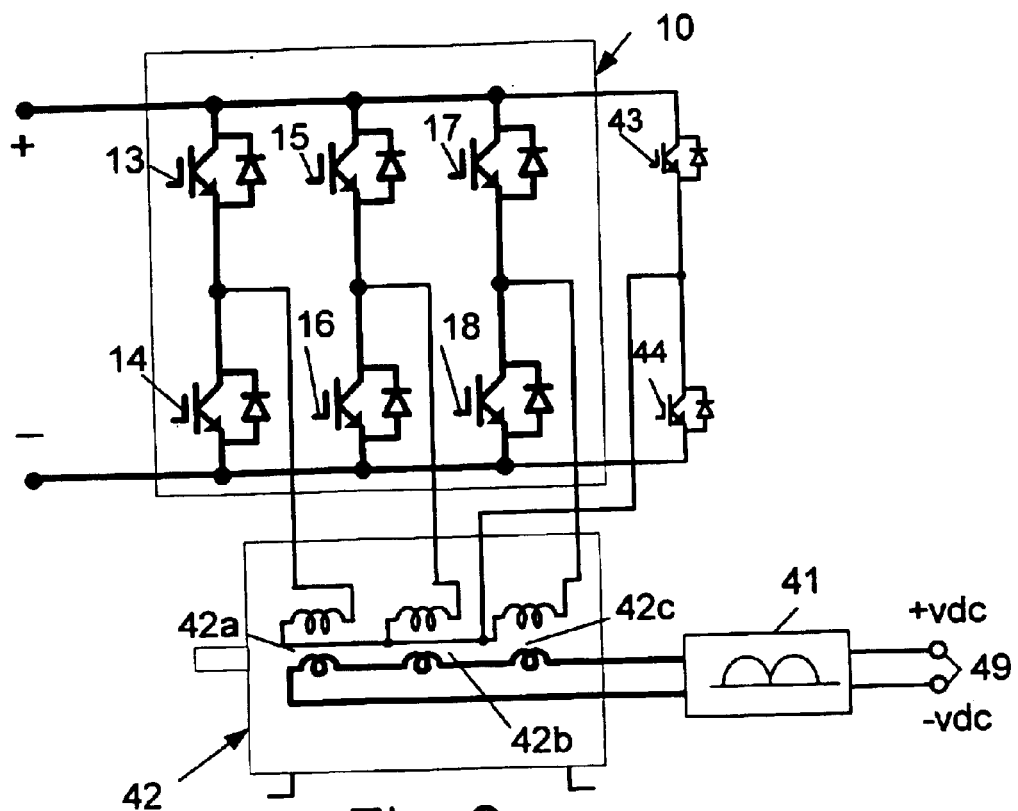
FIG. 9 is an electrical schematic diagram with the addition of a low voltage dc supply connected to receive zero-sequence components from an inverter.
Figure 10:
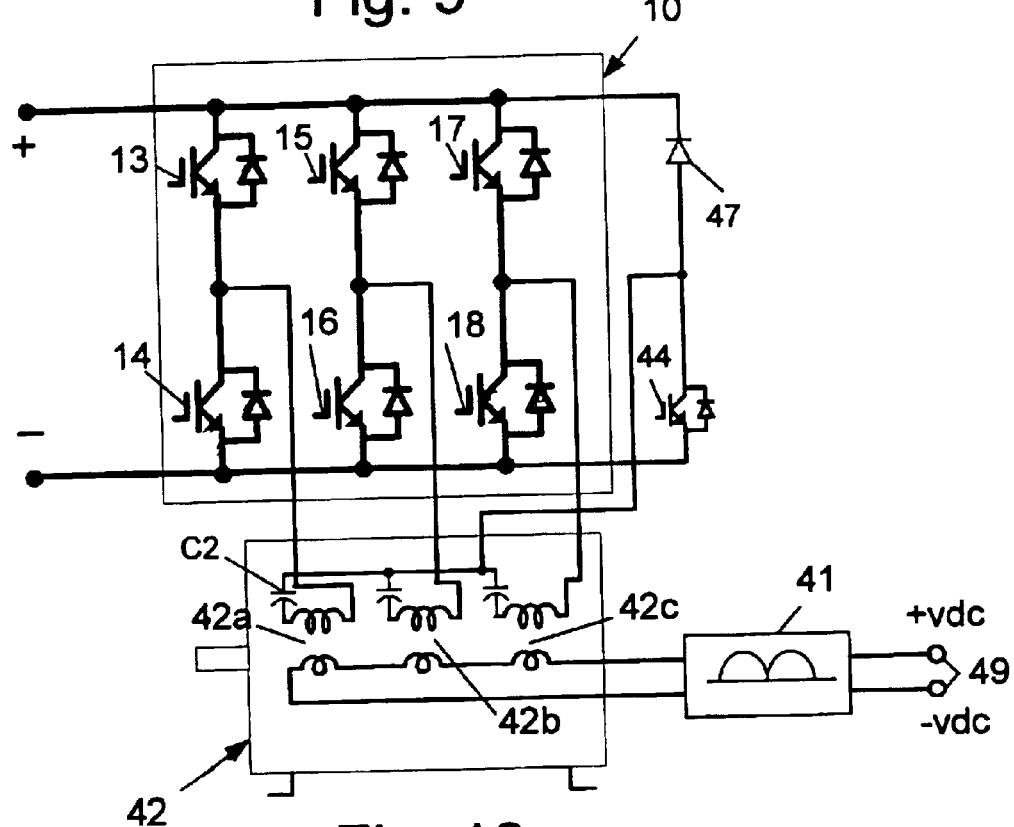
FIG. 10 is the electrical schematic diagram of FIG. 9 with only one power switch in the fourth leg of the inverter circuit and with capacitors added in each leg of the low voltage dc supply.

FIG. 9 shows an example of a motor control circuit having an inverter 10 and a dc-to-dc low voltage output power source 41, 42. The power switching devices 13, 14, 15, 16, 17, 18 of the three legs of the main inverter 10 produce adjustable currents in the motor main windings (not shown) as well as the controllable zero-sequence-switching currents in the three phase transformers 42a, 42b, 42c for the auxiliary converter 42 for a dc low voltage power output at output terminals 49. The three-phase transformers 42a, 42b, 42c of the auxiliary converter 42 can be built into a motor or be separated from the motor. The main windings of the motor can also be used as the primary windings of the transformers. This is based on the known fact that the zero-sequence electric components are not coupled with the positive-sequence electric components that drive the motor. In FIG. 9, two switching devices 43, 44 are used in the branch of the circuit added to the inverter 10. As seen in FIG. 10, only one power-switching device 44 (such as an IGBT) for each auxiliary voltage output 49 is required in the fourth branch of the circuit, along with diode 47, provided that a capacitor C2 is added to each of the transformer circuits 42a, 42b and 42c. These circuits utilize the zero-sequence switching of the switching devices 13–18 of the main inverter 10. The transformers 42a, 42b, 42c provide for stepping up, or in this case, stepping down of the ac voltage of the zero-sequence switching currents. These voltages are then rectified by the rectifier 41 to provide a dc voltage at output terminals 49.

Figure 11:
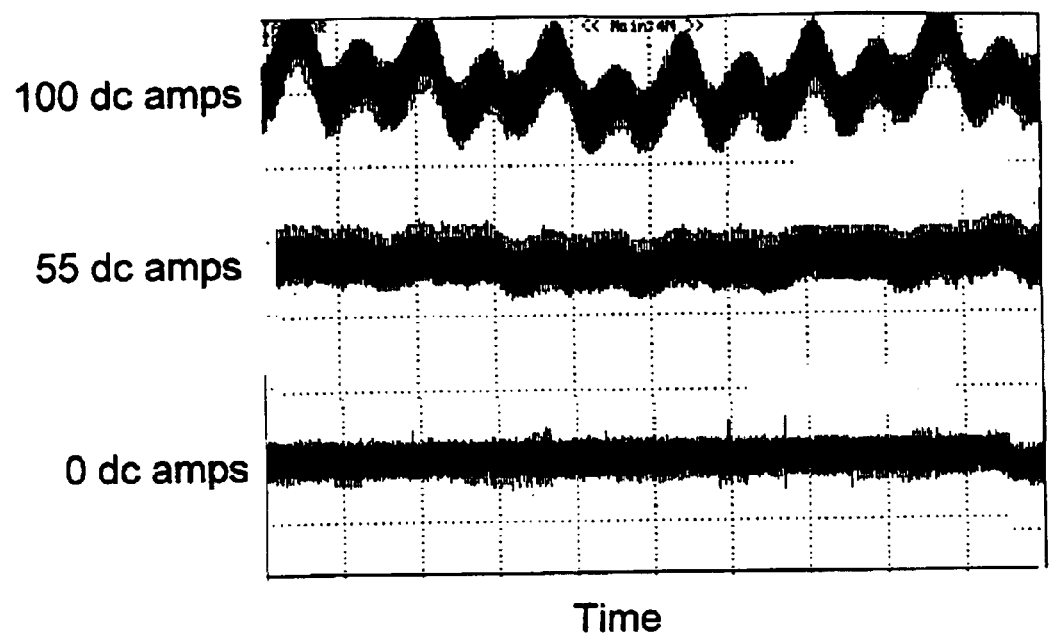
FIG. 11 is a test plot of the dc current supply waveforms developed with a circuit according to FIG. 10 with a 2-phase modulation.

FIG. 11 shows the dc charging current waveforms of the system shown in FIG. 10 at 100, 55, and 0 amperes, respectively, under a full 2-phase modulation.

Figure 12:
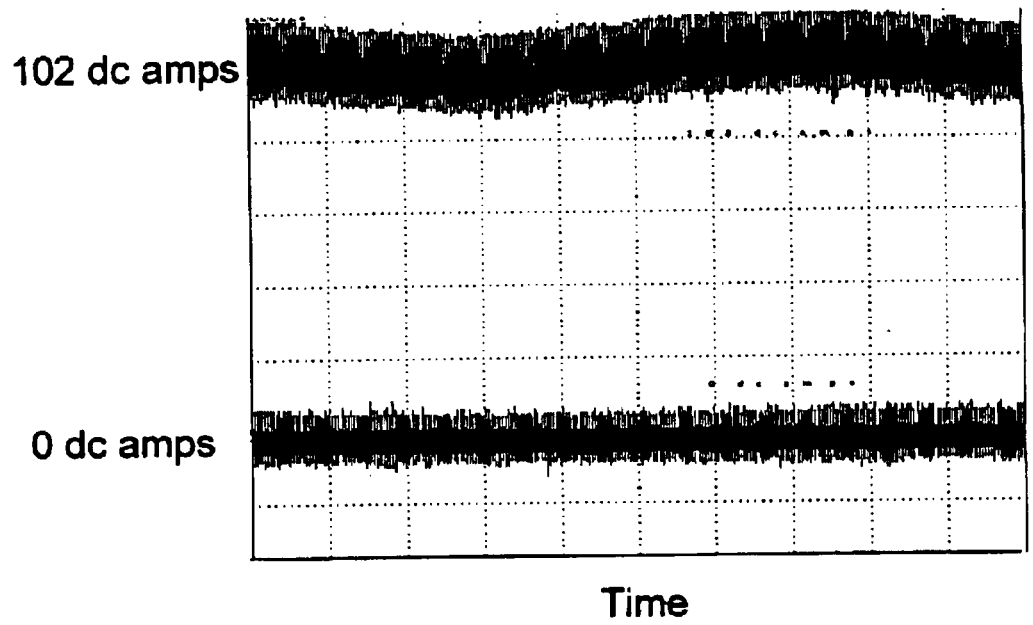
FIG. 12 is a test plot of the dc current supply waveforms developed with a circuit according to FIG. 10 with a 3-phase modulation.

FIG. 12 shows the dc charging current waveforms of the circuit shown in FIG. 10 at 102 and 0 amperes, respectively, under a conventional 3-phase modulation. The 2-phase modulation in FIG. 11 lowers the switching losses of the main inverter 10 in the circuits described above, but may provide less than a 100% duty cycle.

Figure 13:
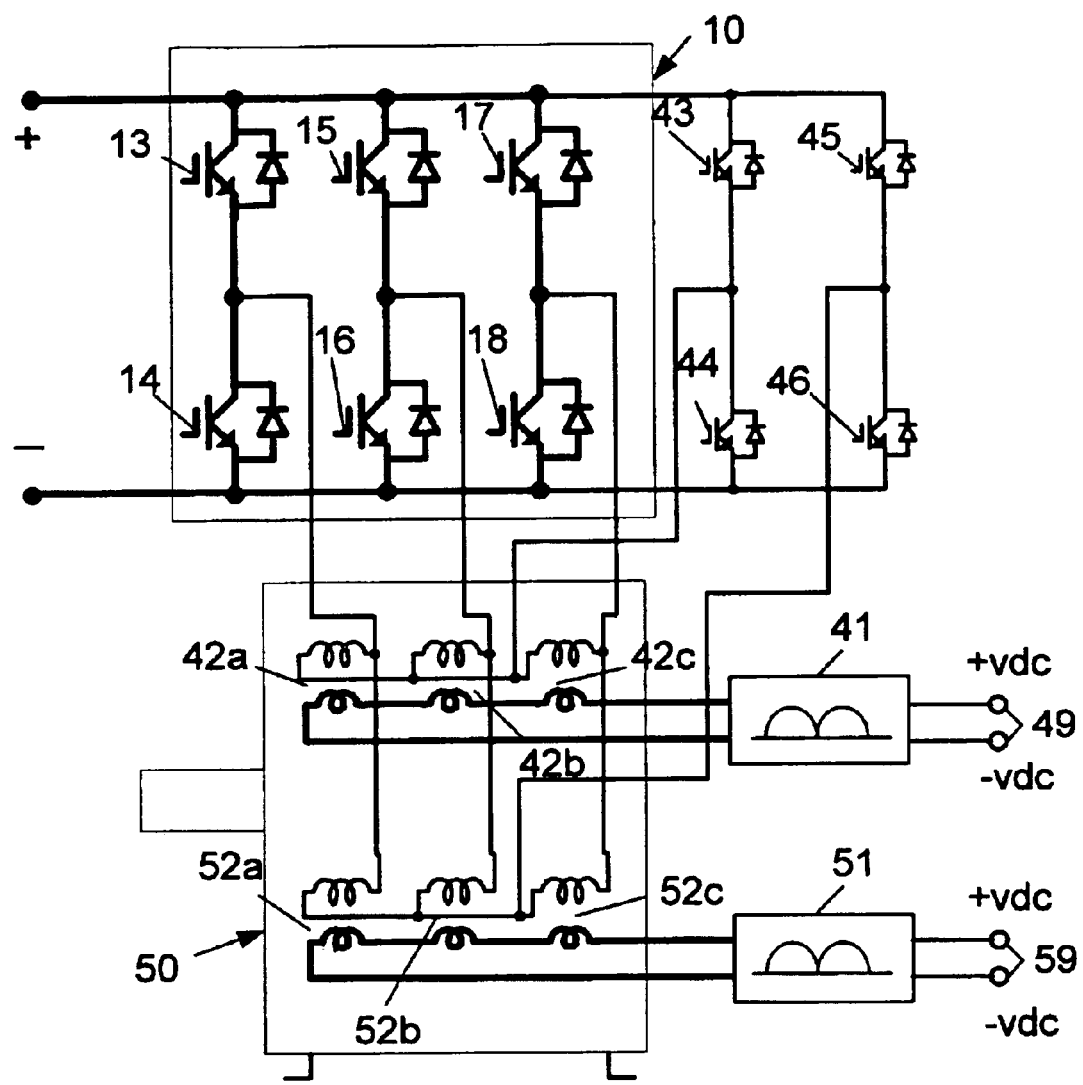
FIG. 13 is an electrical schematic diagram of an inverter according to FIG. 9 with multiple dc supply outputs added.

As shown in FIG. 13, multiple low-voltage DC outputs 49, 59 can also be provided. In FIG. 13, two low-voltage outputs and two low-voltage control branches with pairs of power electronic switches 43, 44 and 45, 46 are connected in parallel with the inverter 10. The center output points of the legs are connected to a pair of auxiliary dc converters in one device 50. This device 50 provides two sets of transformer or motor windings 42a–42c, 52a–52c, which connect to rectifiers 41, 51.

Figure 14:
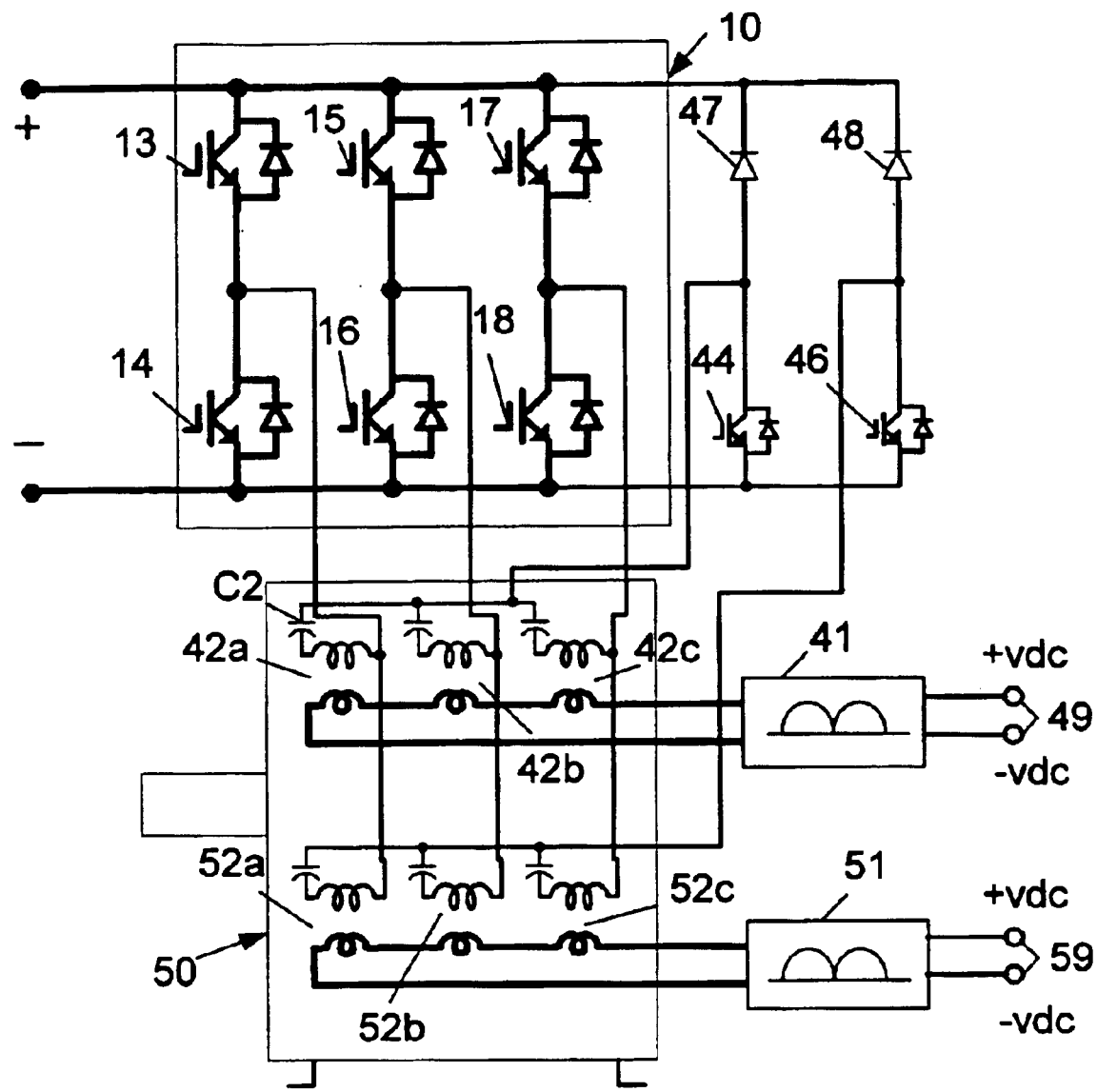
FIG. 14 is an electrical schematic diagram of an inverter according to FIG. 10 with multiple dc supply outputs added.

FIG. 14 shows the simplification of FIG. 13 in which the power switches 43, 45 can be replaced by diodes 47, 48, respectively, provided that capacitors C2 are added to the transformer circuits 42a, 42b, 42c, 52a, 52b and 52c.

Figure 15:
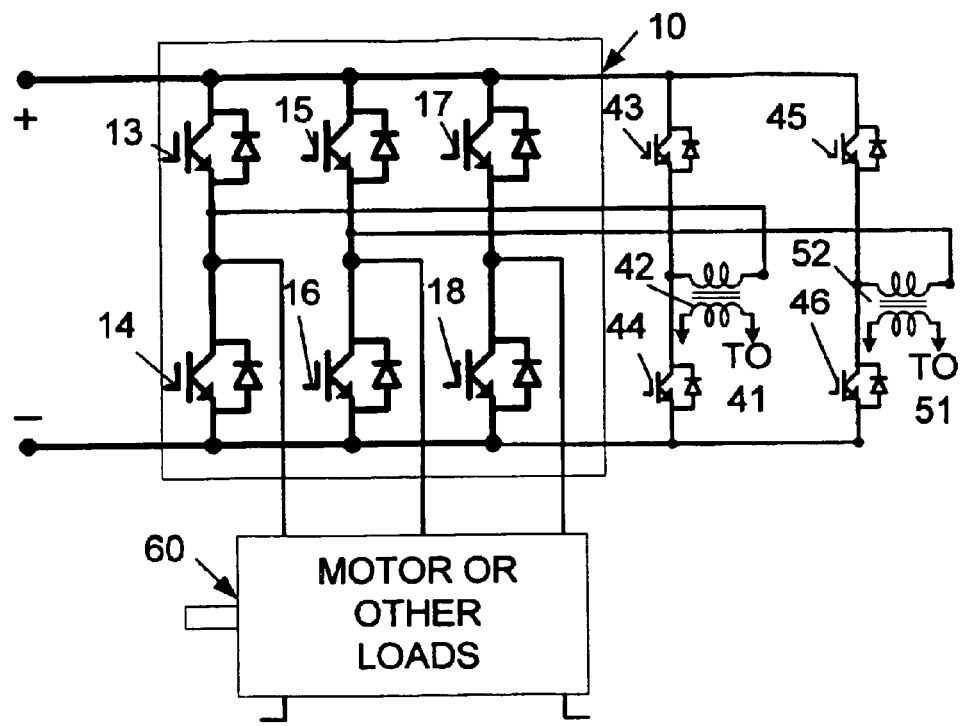
FIG. 15 is a simplified version of the electrical schematic diagram of FIG. 13.
Figure 16:
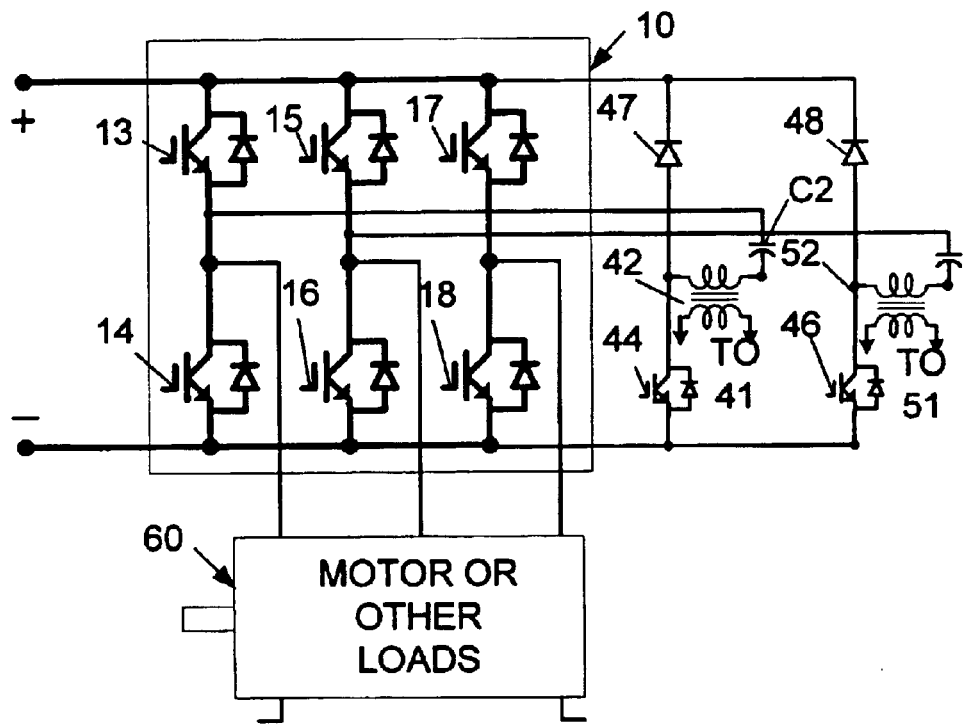
FIG. 16 is a simplified version of the electrical schematic diagram of FIG. 14.

If a less than 100% duty-cycle low DC voltage output is acceptable to the user, the circuits of FIGS. 11 and 12 can be simplified to those shown in FIGS. 15 and 16. In FIGS. 15 and 16, the inverter 10 is shown connected to a motor or other loads 60. Two branches are added to the inverter, in FIG. 15, including pairs of power switching devices 43, 44 and 45, 46. A connection is made between the pairs of devices to receive the zero-sequence switchings of the main inverter. These are conducted through a single transformer coil 42, 52, respectively, to provide a single-phase transformer function. The output of the transformers is conducted to the rectifiers 41, 51 seen in FIGS. 13 and 14 to complete a single-phase low voltage dc supply output. In this circuit the zero-sequence switchings exhibit a duty cycle that occurs when the magnitude of the fundamental voltage of the main inverter goes up.

FIG. 16 is a simplified version of the single-phase conversion of FIG. 15, in which diodes 47, 48 are substituted for power switching devices 43, 45 in FIG. 15.

Figure 17:
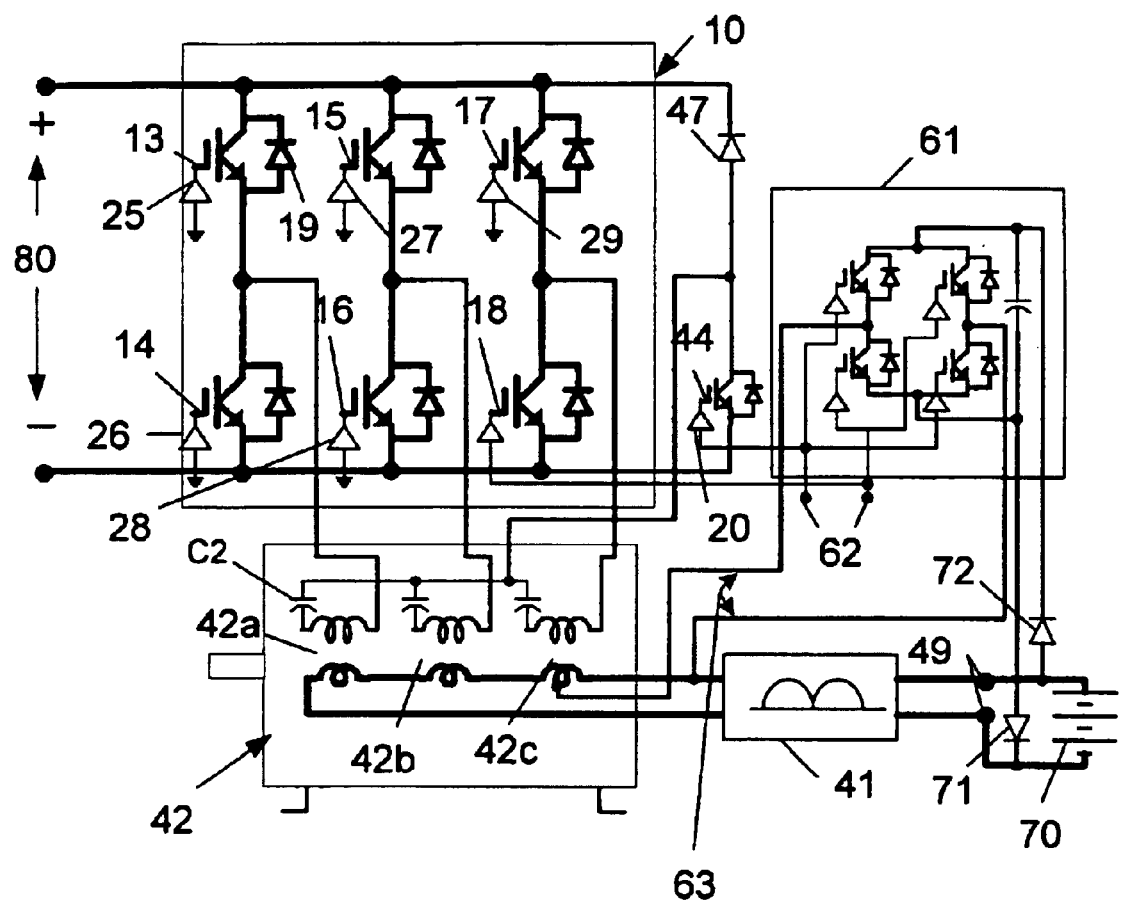
FIG. 17 is an electrical schematic diagram of an inverter with the addition of a reverse charging circuit.

FIG. 17 shows an example of a circuit for feeding back a low voltage at outputs 49 to the main power supply 80. This might allow the conversion of the low voltage power for boosting the main power supply 80 during an emergency situation when the main power supply is sagging or temporarily out of service. This operation can also be used for diagnostic or service operations. An H-bridge 61 of a type known in the art is connected to terminals 49 through diodes 71, 72. A dc source 70 is connected across terminals 49 to supply power to the H-bridge 61. Switching signals from a microelectronic processor (not shown) are provided to the H-bridge at terminals 62 and also to the power switch 40 through the gate switch 20. The output of the H-bridge is fed to the converter 42 through connections 63. From the converter 42 power is fed back through the main inverter 10 the main power supply 80 and to any loads.

The reversed charge circuit of FIG. 17 provides the galvanic-isolation feature. The low voltage side is coupled to the high-voltage side magnetically without a conduction link. All three secondary coils or just one secondary coil in converter 42 can be connected to the output of the H-bridge 61 for the low-to-high-voltage conversion. However, in order to have a higher voltage of the reversed charge, as shown in FIG. 17 only a partial winding of the one secondary coil is connected to the output of the H-bridge for the needed transformer turns ratio. The gate switching signals of the H-bridge 61 are operated in synchronization with one of the power electronic switching devices 18 in the main inverter 10 and one power switch 44 in the fourth leg of the inverter circuit. The unused power electronic switches 13–17 in the main inverter are turned to non-conducting with their gate switches 25–29 in the blocking situation.

In summary, the above-described methods and circuits of the present invention can be used with induction, permanent-magnet, and synchronous machines, with the transformer functions shown in the above-described circuits being achieved by using transformers.

When used with induction motors and the 3-phase main windings of the induction motor are used as the primary windings of the transformers, the motors should have a properly skewed rotor that will not react to the air-gap flux of the winding components of the zero-sequence current. When the main windings of an induction motor are not used as the primary windings of the transformers, any skew that is purely selected for the motor performance may be used. The circuits use the zero-sequence switchings of the main power electronic switching devices of the 3-phase inverter. This enables the use of one additional leg for each low-voltage control (see FIGS. 4 and 5). It is possible to use only one additional power-switching device in an additional leg (see FIG. 5) to control the low dc voltage output.

The single-phase connection circuit (see FIGS. 15 and 16) that shares components of the 3-phase inverter is suitable for the applications having a high duty-cycle tolerance of the low-voltage output.

The three-phase connections (see FIGS. 9, 10, 13, and 14) are particularly suitable (see FIGS. 11 and 12) when used with two-phase modulation (i.e., allowing only four of the six power switching devices of the inverter being switched at any instant) (see FIGS. 7 and 8). This may be helpful with inverters whose low-voltage DC outputs may have a duty cycle problem when operating at a single-phase condition.

The low-to-high-voltage conversion can be achieved by using the additional low voltage H-bridge that is in synchronization with the corresponding power switching devices in the main inverter and the transformer function of the above circuits. Either all of the secondary coils, or one or two coils, or a partial winding of one coil can be connected to the H-bridge output for the needed transformer turns ratio. (An example of the low-to-high voltage is shown in FIG. 17.)

This has been a description of detailed examples of the invention. It will apparent to those of ordinary skill in the art that certain modifications might be made without departing from the scope of the invention, which is defined by the following claims.

We claim:

1. A method for providing at least one additional dc input or output to a dc-to-ac inverter having at least one ac output for a controlling motor load, the method comprising:
   separating at least one zero-sequence phase voltage from other phase voltage in the inverter,
   transforming the zero-sequence phase voltage between a high voltage and a low voltage,
   converting the low voltage between ac and dc, and
   providing at least one low voltage dc input or output as an auxiliary dc power terminal that is responsive to the zero-sequence phase voltage to supply dc power to at least one dc input, wherein said auxiliary dc power terminal is in addition to the ac output of the inverter for controlling the motor load.

2. The method of claim 1, wherein the at least one zero-sequence phase voltage includes three zero-sequence phase voltages, and wherein the three zero-sequence phase voltages are converted to a single dc voltage at the dc output.

3. The method of claim 1, wherein the inverter is operated with two-phase modulation control signals.

4. The method of claim 1, wherein at least two zero-sequence phase voltages are derived to the inverter, wherein the two zero-sequence phase voltages are each transformed and converted to dc output voltages, said dc output voltages being provided at two low voltage dc outputs.

5. The method of claim 1, wherein a dc input is provided for connection of an external dc voltage source, and wherein a dc input signal is converted to ac and stepped up to a higher voltage to be fed back to the inverter.

6. A motor control circuit comprising:

a dc-to-ac inverter with three circuit branches for controlling a load;

a fourth circuit branch added to the inverter and including at least one additional power switching device;

a wye-connected network connected to the circuit branches in the inverter and to the fourth circuit branch for deriving the zero-sequence voltages from the inverter;

a voltage transforming device connected to the wye-connected network to transform the zero-sequence voltages between a first level and a second level;

at least one pair of dc terminals;

an ac-dc conversion device connected between the dc terminals and the voltage transforming device to convert between an ac voltage at the second level and a dc voltage at the dc terminals.

7. The motor control circuit of claim 6, wherein the voltage transforming device converts three phase zero-sequence voltages to a single phase ac output.

8. The motor control circuit of claim 6, wherein the inverter is operated with two-phase modulation control signals.

9. The motor control circuit of claim 6, further comprising a fifth circuit branch added to the inverter and including at least one additional power switching device; and wherein at least two zero-sequence phase voltages are derived from the inverter, wherein voltage transforming device transforms two zero-sequence phase voltages to ac voltages, and wherein two ac-dc conversion devices are provided to convert the two ac voltages to two dc output voltages, said wherein two dc outputs are provided to receive the two dc output voltages.

10. The motor control circuit of claim 6, wherein a dc input is provided for connection of an external dc voltage source, and wherein the ac-dc conversion device converts a dc input signal to ac, and wherein the voltage transforming device converts an ac voltage at the second level to an ac voltage at the first level to be fed back to the inverter.

11. The motor control circuit of claim 6, wherein the voltage transforming device is an ac transformer.

12. The motor control circuit of claim 6, wherein the voltage transforming device is a motor.

* * * * *